United States Patent
Bolz

(10) Patent No.: US 6,848,064 B2
(45) Date of Patent: Jan. 25, 2005

(54) METHOD AND DEVICE FOR SYNCHRONIZING A COMPUTING DEVICE AND A MONITORING CIRCUIT

(75) Inventor: Peter Bolz, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 09/896,634

(22) Filed: Jun. 29, 2001

(65) Prior Publication Data

US 2002/0046362 A1 Apr. 18, 2002

(30) Foreign Application Priority Data

Jun. 30, 2000 (DE) .......................................... 100 30 991

(51) Int. Cl.⁷ ................................................. G06F 11/30
(52) U.S. Cl. .............................. 714/47; 714/12; 714/23; 714/55; 713/400
(58) Field of Search ............................. 714/12, 23, 47, 714/51, 55; 713/400, 500

(56) References Cited

U.S. PATENT DOCUMENTS

| 4,562,544 A | * | 12/1985 | Bonitz et al. ................. 714/23 |
| 5,522,040 A | * | 5/1996 | Hofsass et al. ............... 714/55 |
| 5,682,314 A | * | 10/1997 | Nishino et al. ................ 714/23 |
| 6,385,743 B1 | * | 5/2002 | Huckfeldt et al. ............ 714/51 |
| 6,675,320 B1 | * | 1/2004 | Schumacher et al. ......... 714/12 |

FOREIGN PATENT DOCUMENTS

DE  40 23 700  1/1992

* cited by examiner

Primary Examiner—Robert Beausoliel
Assistant Examiner—Joseph Manoskey
(74) Attorney, Agent, or Firm—Kenyon & Kenyon

(57) ABSTRACT

A method for operating at least one computing device and at least one monitoring circuit (watchdog) which is allocated to the at least one computing device and which is to be controlled by the computing device according to a specific temporal pattern, in particular, for a control or safety device for a motor vehicle, the computing device being reset if the monitoring circuit fails to be controlled according to the temporal pattern. To synchronize, in as easy a manner as possible, the computing device to the monitoring circuit, subsequent to a start-up of the computing device from a reset mode into a working mode, a time base may be ascertained which elapses subsequent to the start-up of the computing device until a reset of the computing device occurs due to a failure to control the monitoring circuit according to the temporal pattern, and the monitoring circuit is controlled at time intervals that are determined as a function of the time base.

20 Claims, 2 Drawing Sheets

METHOD AND DEVICE FOR SYNCHRONIZING A COMPUTING DEVICE AND A MONITORING CIRCUIT

FIELD OF THE INVENTION

The present invention relates to a method for operating at least one computing device and at least one monitoring circuit (watchdog) allocated to the at least one computing device. The computing device is used, in particular, for a control or safety device for a motor vehicle. The monitoring circuit must be controlled by the computing device according to a specific temporal pattern. If the monitoring circuit fails to be controlled according to the temporal pattern, the computing device is reset. The present invention also relates to a control unit having at least one computing device and at least one monitoring circuit (watchdog) which is allocated to the at least one computing device and which is to be controlled by the computing device according to a specific temporal pattern, in particular, for a safety device for a motor vehicle. Finally, the present invention relates to a control element, in particular a read-only memory or a flash memory, for such a control unit.

BACKGROUND INFORMATION

In certain control units and also in motor vehicles, computing devices which are designed as microcontrollers or microprocessors may be used for controlling arbitrary functions in open or closed loop. The functions to be controlled in open/closed loop in a motor vehicle may include, for example, the internal combustion engine, an air conditioning system, or functions which are critical with regard to safety such as an electronic steering (steer-by-wire), an electronic accelerator, an anti-lock braking system (ABS), or a passenger restraint system (airbag, belt tightener, rebound-damping head restraint, etc.)

It is believed that microprocessors may contain only an arithmetic-logic unit, whereas microcontrollers may also include memory devices such as random-access memory (RAM), read-only memory (ROM), electrically erasable programmable read-only memory (EEPROM), or flash memory, as well as peripheral functions such as a digital-to-analog converter or an analog-to-digital converter. It is also believed that microcontrollers can show malfunctions which can be caused by external influences such as electromagnetic irradiation or static discharge. Further causes of malfunctions may include faults due to software errors in a specific operating mode.

To be able to detect such malfunctions of a microcontroller, modern control units possess more or less complex hardware-monitoring circuits, so-called "watchdogs". A watchdog may be implemented, for example, on an application-specific integrated circuit (ASIC). The microcontroller may control or trigger the watchdog according to a specific temporal pattern, for example, at fixed time intervals. If the watchdog fails to be controlled, it assumes a malfunction of the microcontroller and causes a reset of the microcontroller.

Subsequently, the microcontroller is started up from the reset mode into a working mode again. The resetting of the microcontroller includes a reset of all peripheral functions and an initialization of the microprocessor. When starting up the microcontroller from the reset mode, functional performance tests are carried out to be able to detect and, if possible, also to diagnose a malfunction of the microcontroller. In contrast to the resetting and starting up of the microcontroller following a powering on and off of the microcontroller, the supply voltage is uninterruptedly applied to the microcontroller when the microcontroller is reset and started up subsequent to a reset instruction of the watchdog so that the data contents of the memory devices of the microcontroller are retained.

The watchdog can be controlled by the microcontroller in different ways, for example, by a simple digital signal via an electrical connection. It is also possible, however, to control the watchdog by a temporal sequence of signals via several electrical connections. The signals have to be transmitted from the microcontroller to the watchdog according to a specific temporal pattern. A simple watchdog has to be controlled, for example, at regular time intervals before a specific time span elapses. A window watchdog has to be controlled regularly withing a fixed time window. A window watchdog causes a reset of the microcontroller both if the watchdog is controlled too early (before the beginning of the time window) and too late (after the end of the time window).

In German Published Patent Application No. 40 23 700 is discussed a watchdog monitoring circuit which is controlled by a microcontroller at regular time intervals via a watchdog signal. If the frequency of the signal sequence resulting from the individual watchdog signals is outside a specific valid frequency window, the watchdog detects a malfunction of the microcontroller.

A "watchdog" may possess devices for generating watchdog times, the devices being independent of the microcontroller. A watchdog can be set to a fixed temporal pattern, for example to a fixed time interval until a new control, independently of a microcontroller. In case of the more stringent requirement of a window watchdog, the beginning and the end of the time window can be fixedly set independently of a microcontroller. Thus, the temporal pattern according to which the watchdog must be controlled can vary without being recognizable from outside from the watchdog or from the used microcontroller.

At least some microcontrollers may be manufactured with freely programmable program memory, for example, in the flash technology. The flash technology makes it possible for a microcontroller type to be programmed in different applications with application-specific software. The programming can be carried out already at the semiconductor manufacturer's place or only locally at the user's place. For programming, the microcontroller can be inserted in a separated programming unit.

The programming, however, may be carried out or performed at the user's place with the microcontroller being inserted in target hardware such as the control unit of a safety device for a motor vehicle. The programming in the target hardware may be controlled via serial communication between an external computer and an auxiliary program which is executable on the microcontroller. The auxiliary program is also referred to as bootloader and contains the programming algorithms and the data handling. The programming can be carried out, for example, on the manufacturing line of the control unit manufacturer or else directly in a motor vehicle. In a motor vehicle, the serial communication may take place via a so-called "K line" or via a controller area network (CAN) bus.

Different applications of the microcontroller have as a consequence that a microcontroller type may be controlled at different processor clock-pulse rates and the watchdogs may be controlled with different temporal patterns. This may present a great problem, in particular during the programming of the microcontroller with the assistance of the bootloader since, prior to the programming, the microcontroller may not or cannot know the temporal pattern according to which the watchdog is to be controlled.

As understood, individual bootloader software must exist for a specific processor clock-pulse rate and for a specific temporal pattern for controlling the watchdog, respectively, to ensure that the watchdog is controlled. This may be, however, memory-intensive, expensive, and may require too much effort.

A bootloader may prescribe different fixed temporal patterns for controlling the watchdog. The temporal pattern can be configured, for example, via microcontroller ports or internal non-volatile memory cells, which may result in a small flexibility of the bootloaders. Besides the strongly limited flexibility of such bootloaders, it is believed that a further disadvantage of such bootloaders is the relatively large outlay of hardware and software.

SUMMARY OF THE INVENTION

An object of an exemplary embodiment and/or exemplary method of the present invention is to attain, in as easy a manner as possible, a synchronization of a computing device to a monitoring circuit (watchdog) which is allocated to the computing device and which is to be controlled by the computing device according to a specific temporal pattern.

To achieve this objective, on the basis of the exemplary method referred to above, subsequent to a start-up of the computing device from a reset mode into a working mode, a time base that elapses subsequently to the start-up of the computing device until a reset of the computing device due to a failure to control the monitoring circuit according to the temporal pattern may be ascertained, and the monitoring circuit may be controlled at time intervals that are determined as a function of the time base.

According to the exemplary embodiment and/or exemplary method of the present invention, it is believed that the temporal pattern with which the watchdog must be controlled to prevent the watchdog from resetting the computing device is individually determined for the specific application of the computing device. The different applications can differ in the clock-pulse rate of the microprocessor or in the temporal pattern of the watchdog. Using the exemplary method according to the present invention, it is believed that the computing device may be synchronized to the monitoring circuit in a particularly "simple" manner.

To determine the temporal pattern, the computing device is initially started up in an available manner. Subsequent to various initialization processes immediately after the start-up, it is required to control the monitoring circuit. According to the exemplary embodiment and/or exemplary method of the present invention, however, the monitoring circuit fails to be controlled, and the system waits for the monitoring circuit to cause a reset of the computing device because of the failure to be controlled according to the predefined temporal pattern. The time which elapses from the start-up of the computing device until the reset is acquired as the time base as a function of which time intervals are determined which elapse between a control of the monitoring circuit and the next control.

According to another the exemplary embodiment and/or exemplary method of the present invention, the exemplary method may be carried out or performed before an application program is loaded into a program memory of the computing device with the aid of an auxiliary program (bootloader) stored in the computing device. Thus, the time intervals which are determined within the framework of the exemplary method according to the present invention and within which the monitoring circuit must be controlled by the computing device are taken into account during a programming of the computing device with an application program.

In this manner, it is believed that a single bootloader can work independently of the clock-pulse rate of a microprocessor of the computing device and independently of the temporal pattern for controlling the monitoring circuit. The temporal pattern for controlling the monitoring circuit is individually determined prior to each programming of the computing device. The monitoring device is controlled at the determined time intervals so that the monitoring device is prevented from resetting the computing device during the programming of the computing device.

According to another exemplary embodiment and/or exemplary method of the present invention, the time intervals may be determined by multiplying the time base by a correction factor. The correction factor may be advantageously selected to be smaller than one (1), and may be between 0.75 and 0.9. The time base represents the time span after which the watchdog would have been required to be controlled at the latest to prevent the monitoring circuit to cause a reset of the computing device.

The correction factor slightly reduces the time intervals so that the watchdog is controlled somewhat before the latest possible point in time. In this manner, it is believed that the monitoring circuit can be prevented from erroneously causing a reset of the computing device because of a slight time shift in controlling the watchdog toward later points in time, for example, due to manufacturing tolerances of the microcontroller or because of prolonged signal propagation times.

According to another exemplary embodiment and/or exemplary method of the present invention, for ascertaining the time base, a counter may be incremented subsequently to the start-up of the computing device from a reset mode into a working mode, and the counter content may be stored in a first memory element, which may be a random-access memory (RAM). The counter stores the difference of the counter content of a system timer after the start-up of the computing device (system start-up) to the counter content during the waiting for a reset through the watchdog.

In some microcontrollers, the system timer is automatically started subsequent to the start-up of the computer. In other microcontrollers, the system timer needs to be started via a special instruction subsequent to the start-up of the computer. The counter content is stored in a memory element to which a supply voltage is uninterruptedly applied while the computing device is reset and started up anew so that the content of the memory element is not lost even after a new start-up of the computing device.

According to another exemplary embodiment and/or exemplary method of the present invention, after a new start-up of the computing device subsequent to the reset of the computing device because of a failure to control the monitoring circuit, the counter content may be read out from the first memory element and used as the time base for controlling the monitoring circuit. The counter content corresponds to the instant at which the watchdog would have been required to be controlled at the latest subsequent to the start-up of the computing device to prevent a reset of the computing device caused by the monitoring circuit. Based on the counter content, a time base may be ascertained and time intervals which may be used for the control of the watchdog.

Subsequent to a start-up of the computing device from a reset mode into a working mode, a first predefinable bit pattern may be advantageously stored in a second memory element, and the content of the second memory element may be interrogated each time the computing device is started up for recognizing a new start-up of the computing device. If the content of the second memory element at the start-up of the computing device corresponds to the first bit pattern, a new start-up of the computing device is present and not a start-up following a powering-on of the computing device. When the computing device is started up anew, the content of the first memory element is then read out, and the time intervals for controlling the monitoring circuit are determined.

According to another exemplary embodiment and/or exemplary method of the present invention, subsequent to a new start-up of the computing device, a second predefinable bit pattern which is different from the first bit pattern may be stored in the second memory element. A malfunction of the computing device and, consequently, a reset of the computing device, may indeed happen during the execution of the exemplary method according to present invention. In such a case, the counter content stored in the first memory element may not have yet reached its final value. In fact, the counter content may not represent the latest possible instant for controlling the monitoring circuit but merely the instant at which the computing device was reset due to the malfunction.

Using the exemplary embodiment and/or exemplary method, an incorrect counter content stored in the first memory element may be prevented from being used as the time base for controlling the monitoring circuit. The monitoring circuit is initially controlled with the determined incorrect time interval and, consequently, causes a reset of the computing device. After the computing device is started up anew, the exemplary method according to the present invention is then run once again and, this time, the correct time interval is determined unless the computing device is reset anew due to a malfunction.

To detect a new start-up of the computing device, it is alternatively or additionally proposed that, each time the computing device is started up, it is checked whether a flag (power-on flag) of the computing device for detecting a start-up of the computing device from a reset mode into a working mode following a powering-on of the computing device is set. The power-on flag is a hardware bit which is set after the computing device is started up for the first time after powering-on but which is not set after the computing device is started up subsequent to a reset. By interrogating the power-on flag, it can be established whether the computing device starts up for the first time after the powering-on of the computing device or subsequent to a reset of the computing device. A power-on flag, however, may not be available in every computing device.

It is believed that the implementation of the exemplary method according to the present invention in the form of a control element provided for a control unit, in particular of a safety device for a motor vehicle, may be of special importance. In this context, a program is stored on the control element which is executable on a computing device, in particular on a microprocessor, and suitable for carrying out or performing the exemplary method according to the present invention.

In this case, the exemplary embodiment and/or exemplary method of the present invention may be implemented via a program stored on the control element so that this control element provided with the program represents the exemplary embodiment and/or exemplary method of the present invention in the same manner as the exemplary method for whose execution the program is suitable. The control element may be, in particular, an electric storage medium such as a read-only memory or a flash memory.

In another exemplary embodiment and/or exemplary method of the present invention, on the basis of the control unit of the type referred to above, the control unit contains an apparatus, arrangement or structure for ascertaining a time base that elapses subsequently to a start-up of the computing device from a reset mode into a working mode until a reset of the computing device occurs due to a failure to control the monitoring circuit according to the temporal pattern, and the control unit may have a second apparatus, arrangement or structure for controlling the monitoring circuit at time intervals which correspond to the time base.

DETAILED DESCRIPTION

Figure 1:
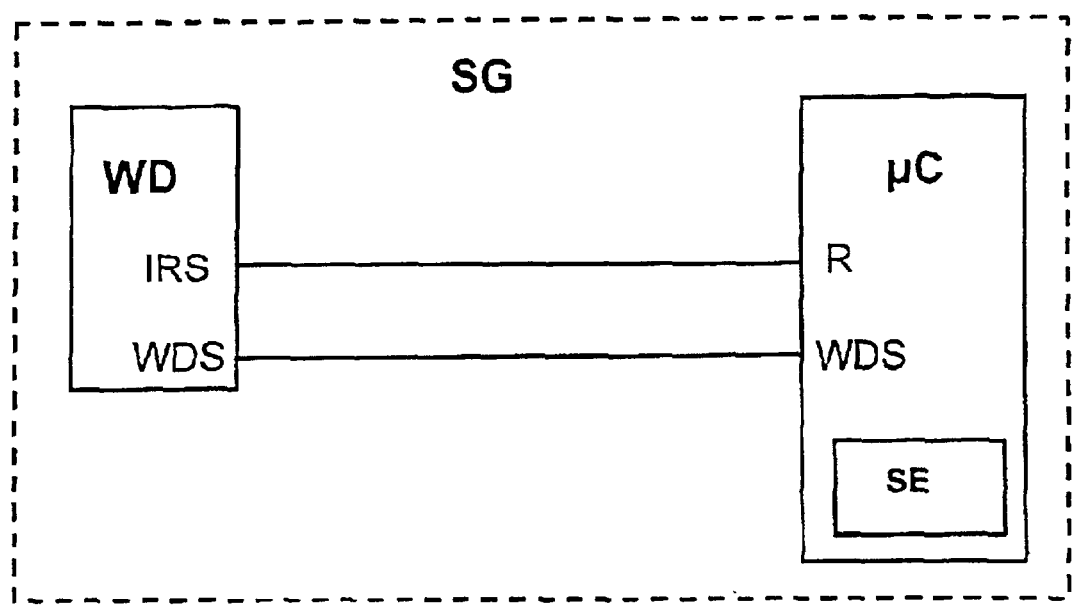
FIG. 1 shows an exemplary system which includes a watchdog and a microcontroller according to an exemplary embodiment and/or exemplary method of the present invention.

FIG. 1 shows a microcontroller ($\mu$C) having at least one control element SE, in particular at least one memory element such as a read-only memory, random-access memory or flash memory, and a watchdog WD, which are interconnected.

Via port WDS of the microcontroller, the watchdog signal, that is, a signal which is transmitted according to a specific temporal pattern, can be transmitted to watchdog WD on its WDS port.

The watchdog can trigger a reset of the microcontroller via a watchdog port IRS which is connected to a reset port R of the microcontroller. To this end, for example, a pulse reset signal is sent from the watchdog to microcontroller $\mu$C.

In this context, the system may be, for example, part of a control unit SG or accommodated in a control unit SG.

Figure 2:
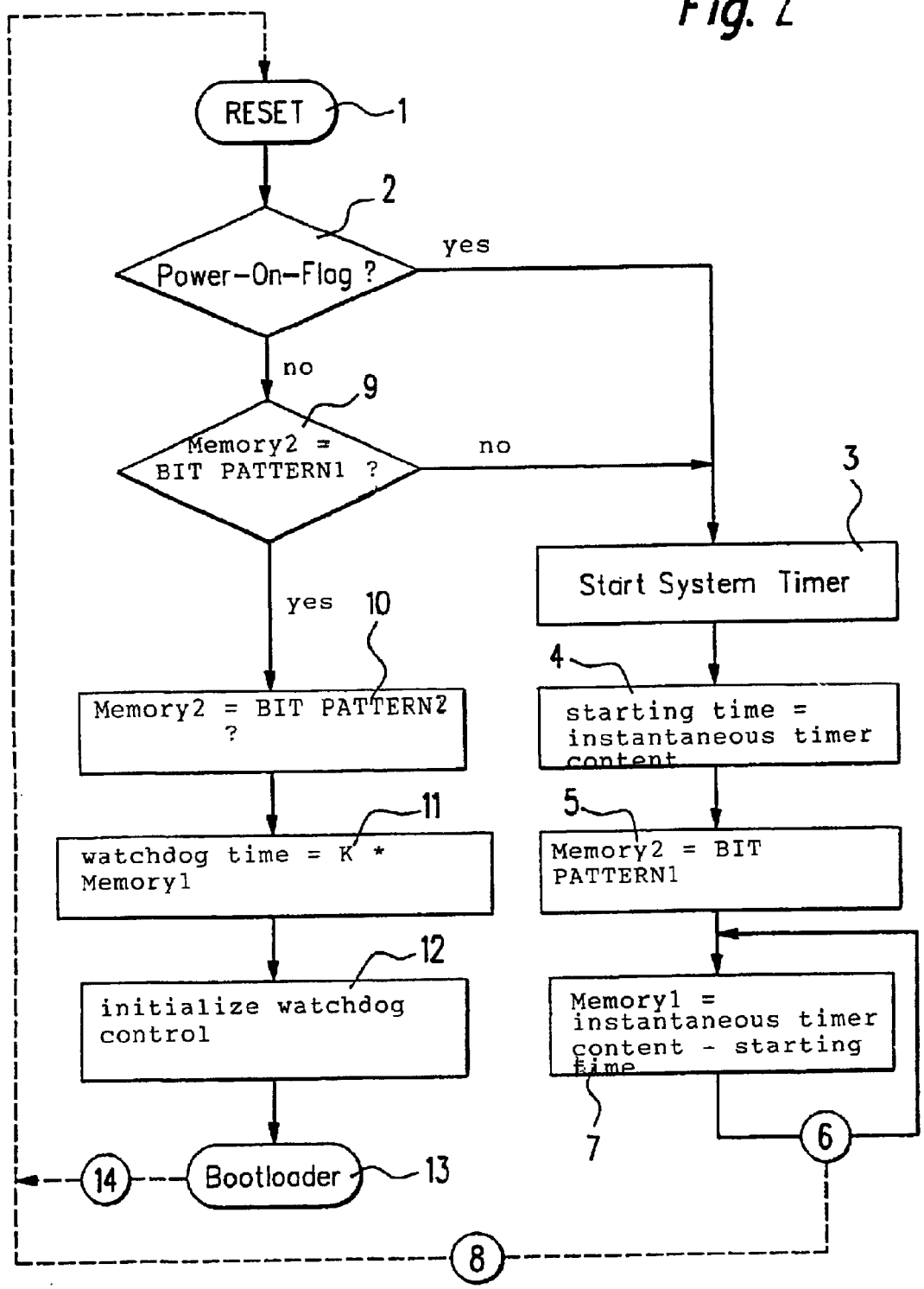
FIG. 2 shows an exemplary flow chart of an exemplary method according to the present invention.

In this connection, the watchdog and the microcontroller are synchronized according to the exemplary embodiment and/or exemplary method of the present invention, which is further explained with respect to FIG. 2.

The exemplary method according to the present invention of FIG. 2 is used for synchronizing a microcontroller to an external watchdog. A "watchdog" is a hardware-monitoring circuit that is controlled by the microcontroller according to a specific temporal pattern. If the watchdog fails to be controlled according to the predefined temporal pattern, it assumes a malfunction of the microcontroller and causes a reset of the microcontroller.

The exemplary method according to the present invention is executed, in particular, at the beginning of a programming of the microcontroller. For programming, the microcontroller is inserted in a "target hardware", for example, in a control unit for a control or safety device for a motor vehicle. The programming in the target hardware is generally controlled via a serial communication between an external programming computer and an auxiliary program which is executable in the microcontroller. The auxiliary program is also referred to as bootloader and contains the programming algorithms and the data handling.

Denoted as a bootloader in the context of the exemplary embodiment and/or exemplary method of the present invention is a microcomputer-specific bootloader, which may be provided in the microcontroller by the semiconductor manufacturer, or which may be programmed in by a user in a separate programming unit prior to the installation of the microcontroller in the target hardware. Such a bootloader may be uniform for many different applications and user-independent. On the other hand, the bootloader can be a software which is created by the user for a specific application or in compliance with certain requirements of the user (compatibility with other bootloaders, uniform bootloader for a specific motor vehicle type or for a motor vehicle manufacturer, etc.)

In the exemplary method according to the present invention of FIG. 2, the synchronization of the microcontroller to the external watchdog is carried out or performed by a program sequence at the beginning of the bootloader. Initially, the watchdog fails to be controlled by the microcontroller. The system waits for the watchdog to cause a reset of the computing device because of the failure to control the watchdog according to the predefined temporal pattern. A time base is measured from the start-up of the computing device until the reset of the computing device due to a failure to control the watchdog, and a watchdog time, that is, a time interval between two consecutive controls of the watchdog is then determined from the time base. The microcontroller can then control the watchdog at this time interval during programming, thus preventing a reset of the microcontroller.

The exemplary method according to the present invention starts at functional block 1 with a start-up of the computing device from a reset mode into a working mode. The computing device can start up for the first time after the powering-on of the computing device (a so-called "cold start") or start-up anew subsequent to a reset instruction of the watchdog (a so-called "warm start").

In a subsequent interrogation block 2, it is checked whether a power-on flag is set. The power-on flag is a hardware bit which is set after the computing device is started up for the first time subsequent to a powering-on of the computing device. In the case of a new start-up of the computing device due to a reset instruction of the watchdog, the power-on flag is not set. Interrogation block 2 is only present in the case of those microcontrollers which have a power-on flag. The interrogation of the power-on flag is used as an additional interrogation as to whether the computing device starts up for the first time after the powering-on of the computing device or whether it starts up anew subsequently to a reset instruction of the watchdog. Interrogation block 2 could also be dispensed within the context of the exemplary method according to the present invention.

If the computing device starts up for the first time after the powering-on of the computing device, a branch is made to functional block 3 where a counter is started. The counter may be, for example, as a system timer. There are also microcontrollers which have a free-running/self-starting system timer (for example, Motorola HC12) which needs not to be started. When working with such microcontrollers, functional block 3 can be dispensed within the exemplary method according to the present invention.

Subsequently, the instantaneous content of the system timer is stored as the starting time in functional block 4. In functional block 5, a first predefinable bit pattern (BIT PATTERN1) is stored in a second memory element (Memory2). Subsequently, the exemplary method according to the present invention enters into an endless loop 6 in course of which the difference of the instantaneous content of the system timer and the starting time is stored in a first memory element (Memory1) in a functional block 7. The first memory element may be, for example, a random-access memory (RAM) to which a supply voltage is uninterruptedly applied while the computing device is reset and started up due to a reset instruction of the watchdog (warm start). Because of this, the content of the first memory element is still present after a reset of the computing device provided that the supply voltage remains stable. Endless loop 6 is run through until the watchdog causes the computing device to be reset because of the failure to control the watchdog according to the predefined temporal pattern. The reset of the computing device is represented by a broken line 8 in FIG. 2.

Subsequent to the reset 8 of the computing device, the computing device starts up anew in functional block 1. Since this is a new start-up following a reset instruction of the watchdog, the power-on flag is not set and the exemplary method branches from interrogation block 2 to interrogation block 9 where it is checked whether the first bit pattern (BIT PATTERN1) is stored in second memory element (Memory2).

Since in functional block 5, the first bit pattern has been stored in the second memory element, a branch is now made from interrogation block 9 to functional block 10 where a second bit pattern (BIT PATTERN2) is stored in second memory element (Memory2), the second bit pattern differing from the first bit pattern.

Subsequently, in a functional block 11, a watchdog time is determined from the product of a correction factor K and the content of first memory element (Memory1). The watchdog time is the time interval lying between two control signals of the microcontroller for the watchdog immediately following each other. Correction factor K is smaller than 1, and, in particular, it may be in the range between 0.75 and 0.9. Via correction factor K, tolerances in the microcontroller or in the watchdog are allowed for by advancing the control of the watchdog. In this manner, it is believed that an erroneously triggered reset of the computing device, caused by controlling the watchdog too late, may be prevented.

In a subsequent functional block 12, a watchdog control is initialized which has a period which corresponds to the watchdog time. Finally, a branch is made to the bootloader functionality in functional block 13. There, an application program is loaded into the program memory of the microcontroller with the aid of the bootloader. Using different application programs, it is possible for a microcontroller type to be used for different control applications. During the programming of the microcontroller, the watchdog is controlled using the period determined in functional block 12 to prevent the microcontroller from being reset during the programming. If no application program needs to be loaded into the program memory of the microcontroller, for example in a later use of the control unit, because the application program is already loaded, a jump is made from bootloader 13 directly to the application program.

In the following, a special case of the exemplary method according to the present invention will be explained in which the microcontroller is caused to be reset during endless loop 6 due to a malfunction of the microcontroller. Thus, endless loop 6 is exited earlier than intended, resulting in that an incorrect value is stored in first memory element (Memory1). This, in turn, results in that an incorrect watchdog time is determined in functional block 11 and in that an incorrect period for the watchdog control is determined in functional block 12 subsequent to starting up the computing device anew. Consequently, the computing device is reset during the programming of the microcontroller in functional block 13 because the watchdog has been controlled according to an incorrect temporal pattern. The reset is represented by a broken line 14 in FIG. 2.

Subsequent to resetting the computing device, the computing device starts up anew. Functional block 1 and interrogation block 2 are run as described above. No branch, however, is made from interrogation block 9 to functional block 10, as described above, but to functional block 3 since in the previous run of the exemplary method, second bit pattern (BIT PATTERN2) has been stored in second memory element (Memory2) in functional block 10. In functional blocks 4 through 7, the time duration which elapses from the start-up of the computing device until a reset of the computing device because of a failure to control the watchdog is then determined again and stored in first memory (Memory1).

Subsequently, the correct watchdog time is calculated in functional block 11 and the correct period for the watchdog control is calculated in functional block 12 so that the microcontroller can be controlled with the temporal pattern predefined by the watchdog during the programming of the program memory of the microcontroller with the aid of the bootloader in functional block 13.

What is claimed is:

1. A method for operating at least one computing device and at least one monitoring circuit, which is allocated to the at least one computing device and which is to be controlled by the computing device according to a specific temporal pattern, for at least one of a control device and a safety device for a motor vehicle, the computing device being reset if the monitoring circuit fails to be controlled according to the temporal pattern, the method comprising:
   ascertaining, subsequently to a start-up of the computing device from a reset mode into a working mode, a time base that elapses subsequently to the start-up of the computing device until the computing device is reset due to a failure to control the monitoring circuit according to the specific temporal pattern; and
   controlling the monitoring circuit at time intervals that are determined as a function of the time base.

2. The method of claim 1 wherein the method is performed before an application program is loaded into a program memory of the computing device with the aid of at least one of an auxiliary program and a bootloader stored in the computing device.

3. The method of claim 1, wherein ascertaining the time base includes incrementing a counter subsequently to the start-up of the computing device from a reset mode into a working mode, and storing a content of the counter in at least one of a first memory element and a random-access memory.

4. The method of claim 3 wherein:
   ascertaining the time base includes reading out the content of the counter from the at least one of the first memory element and the random-access memory, after a new start-up of the computing device subsequent to a reset of the computing device because of a failure to control the monitoring circuit; and
   the content is used as the time base in the controlling of the monitoring circuit.

5. The method of claim 4, wherein, subsequent to the start-up of the computing device from the reset mode into the working mode, a first predefinable bit pattern is stored in a second memory element, a content of the second memory element being interrogated each time the computing device is started up for recognizing the new start-up of the computing device.

6. The method of claim 5, wherein, subsequent to the new start-up of the computing device, a second predefinable bit pattern that is different from the first bit pattern is stored in the second memory element.

7. The method of claim 4, wherein, each time the computing device is started up, it is checked whether at least one of a flag and a power-on flag, which is of the computing device and which is for detecting the start-up of the computing device from the reset mode into the working mode following a powering-on of the computing device, is set.

8. A method for operating at least one computing device and at least one monitoring circuit, which is allocated to the at least one computing device and which is to be controlled by the computing device according to a specific temporal pattern, for at least one of a control device and a safety device for a motor vehicle, the computing device being reset if the monitoring circuit fails to be controlled according to the temporal pattern, the method comprising:
   ascertaining, subsequently to a start-up of the computing device from a reset mode into a working mode, a time base that elapses subsequently to the start-up of the computing device until the computing device is reset due to a failure to control the monitoring circuit according to the specific temporal pattern; and
   controlling the monitoring circuit at time intervals that are determined as a function of the time base;
   wherein the time intervals are determined by multiplying the time base by a correction factor.

9. The method of claim 8, wherein the correction factor is selected to be at least one of less than 1 and between 0.75 and 0.9.

10. A control element for a control unit for a motor vehicle, the control unit having at least one of a control device and a safety device, the control element comprising:
    at least one of a read-only memory and a flash memory for storing a program that is executable on at least one of a computing device and a microprocessor;
    wherein the program includes a method for operating at least one computing device and at least one monitoring circuit, which is allocated to the at least one computing device and which is to be controlled by the computing device according to a specific temporal pattern, for the at least one of the control device and the safety device, the computing device being reset if the monitoring circuit fails to be controlled according to the temporal pattern, the method including:
       ascertaining, subsequent to a start-up of the computing device from a reset mode into a working mode, a time base that elapses subsequently to the start-up of the computing device until the computing device is reset due to a failure to control the monitoring circuit according to the specific temporal pattern; and
       controlling the monitoring circuit at time intervals that are determined as a function of the time base.

11. The control element of claim 10, wherein the method is performed before an application program is loaded into a program memory of the computing device with the aid of at least one of an auxiliary program and a bootloader stored in the computing device.

12. The control element of claim 10, wherein ascertaining the time base includes incrementing a counter subsequently to the start-up of the computing device from a reset mode into a working mode, and storing a content of the counter in at least one of a first memory element and a random-access memory.

13. The control element of claim 12, wherein:
ascertaining the time base includes reading out the content of the counter from the at least one of the first memory element and the random-access memory, after a new start-up of the computing device subsequent to a reset of the computing device because of a failure to control the monitoring circuit; and
the content is used as the time base in the controlling of the monitoring circuit.

14. The control element of claim 13, wherein, subsequent to the start-up of the computing device from the reset mode into the working mode, a first predefinable bit pattern is stored in a second memory element, a content of the second memory element being interrogated each time the computing device is started up for recognizing the new start-up of the computing device.

15. The control element of claim 14, wherein, subsequent to the new start-up of the computing device, a second predefinable bit pattern that is different from the first bit pattern is stored in the second memory element.

16. The control element of claim 13, wherein, each time the computing device is started up, it is checked whether at least one of a flag and a power-on flag, which is of the computing device and which is for detecting the start-up of the computing device from the reset mode into the working mode following a powering-on of the computing device, is set.

17. A control element for a control unit for a motor vehicle, the control unit having at least one of a control device and a safety device, the control element comprising:
at least one of a read-only memory and a flash memory for storing a program that is executable on at least one of a computing device and a microprocessor;
wherein the program includes a method for operating at least one computing device and at least one monitoring circuit, which is allocated to the at least one computing device and which is to be controlled by the computing device according to a specific temporal pattern, for the at least one of the control device and the safety device, the computing device being reset if the monitoring circuit fails to be controlled according to the temporal pattern, the method including:
ascertaining, subsequent to a start-up of the computing device from a reset mode into a working mode, a time base that elapses subsequently to the start-up of the computing device until the computing device is reset due to a failure to control the monitoring circuit according to the specific temporal pattern; and
controlling the monitoring circuit at time intervals that are determined as a function of the time base; and
wherein the time intervals are determined by multiplying the time base by a correction factor.

18. The control element of claim 17, wherein the correction factor is selected to be at least one of less than 1 and between 0.75 and 0.9.

19. A control unit for at least one of a control device and a safety device for a motor vehicle, the control unit comprising:
at least one computing device;
at least one monitoring circuit allocated to the at least one computing device and controllable by the computing device according to a specific temporal pattern;
a time base ascertaining arrangement for ascertaining a time base that elapses subsequently to a start-up of the computing device from a reset mode into a working mode until the computing device is reset due to a failure to control the monitoring circuit according to the temporal pattern; and
a controlling arrangement for controlling the monitoring circuit at time intervals corresponding to the time base.

20. A control unit for at least one of a control device and a safety device for a motor vehicle, the control unit comprising:
at least one computing device;
at least one monitoring circuit allocated to the at least one computing device and controllable by the computing device according to a specific temporal pattern;
means for ascertaining a time base that elapses subsequently to a start-up of the computing device from a reset mode into a working mode until the computing device is reset due to a failure to control the monitoring circuit according to the temporal pattern; and
means for controlling the monitoring circuit at time intervals corresponding to the time base.

* * * * *